Jan. 26, 1926.
A. SCHROEDER
TRUCK
Filed May 5, 1922
1,570,787
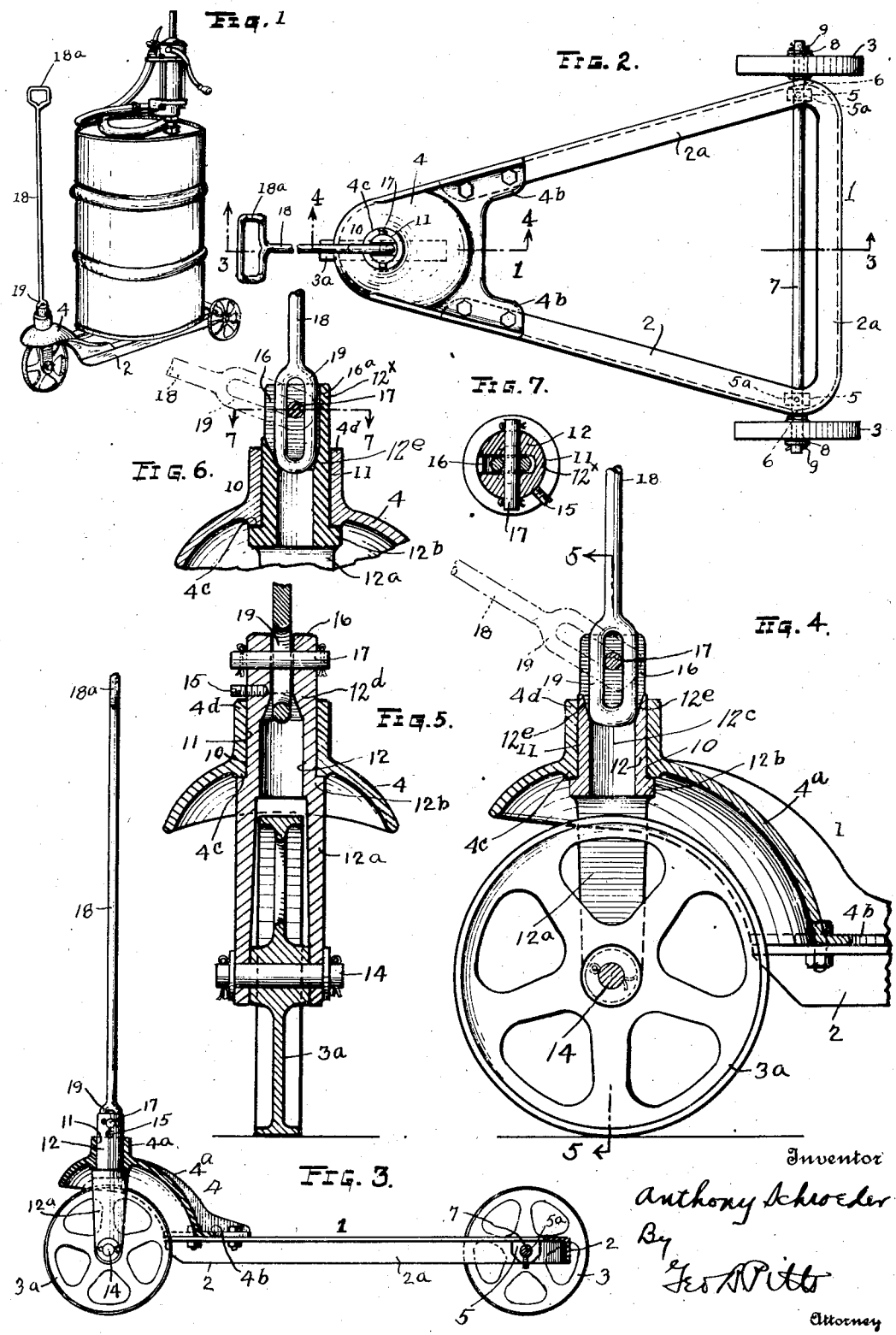
Inventor
Anthony Schroeder
By
Geo N Pitts
Attorney Patented Jan. 26, 1926.

1,570,787

UNITED STATES PATENT OFFICE.

ANTHONY SCHROEDER, OF CLEVELAND, OHIO, ASSIGNOR OF ONE-HALF TO JAMES MERLE FINNEY, OF CLEVELAND, OHIO.

TRUCK.

Application filed May 5, 1922. Serial No. 558,628.

*To all whom it may concern:*

Be it known that I, ANTHONY SCHROEDER, a citizen of the United States, residing at Cleveland, in the county of Cuyahoga and State of Ohio, have invented certain new and useful Improvements in and Relating to Trucks, of which the following is a specification.

This invention relates to a vehicle, more particuarly to the connection for the member by means of which the vehicle is moved or operated. The operating member will be referred to herein as a tong, for clearness and convenience, but in the use of such term applicant does not wish to be understood as limiting the scope of his invention, as such member may constitute a link, coupling bar or other device where the vehicle is to be operated by a tractor or other propelled mechanism. The type of vehicle chosen for illustrative purposes consists of a truck adapted for transporting loads. In the preferred embodiment, which is shown in the accompanying drawing, the tong has a handle which may be grasped when the truck is to be pushed or pulled by an operative. In constructions within my knowledge, whether the tong or operating member is to be grasped and operated manually or is adapted for connection with a tractor, it is pivoted to the truck and when not in use, it is free to extend laterally or rest at its free end on the floor and hence be in the way of moving objects as well as to cause accidents. Trucks of this character are often used under crowded conditions. On account of their compactness they are frequently left in narrow spaces, so that the tong, unless it is positively supported in an elevated position by specially provided mechanical devices, will fall across the space or passageway adjacent the truck where it will form an obstruction as well as a tripping device for persons passing. It is therefore one of the objects of invention to provide improved means for supporting the tong in an elevated position whereby these objections and accidents resulting are overcome.

Another object of the invention is to provide an improved connection for the member by means of which the truck is moved or operated, whereby such member, when not in use, may be readily positioned and supported vertically.

A further object of the invention is to provide an improved tong connection in which the tong may be fixed in an elevated position or released for operation in a ready manner without the manipulation or release of detachable devices.

Other objects of the invention will be apparent to those skilled in the art to which my invention relates from the following description taken in connection with the accompanying drawing.

In the drawing, Fig. 1 is a perspective view of a vehicle, such as a truck, embodying my invention.

Fig. 2 is a top plan view of the truck.

Fig. 3 is a section on the line 3—3 of Fig. 2.

Fig. 4 is a fragmentary section through the pivot pin for the steering wheel on the line 4—4 of Fig. 2, enlarged.

Fig. 5 is a section on the line 5—5 of Fig. 4.

Figs. 6 and 7 are fragmentary sectional views illustrating a modified form of construction embodying my invention.

Referring to the drawing, 1 indicates as an entirety the truck frame, which may comprise a plurality of angle iron sections 2 preferably formed from a single bar of angle iron $2^a$ bent into the desired shape. 3 indicates the wheels for the truck. While my invention may be applied to a truck having four wheels, I have chosen to apply it to a truck having three wheels, one (indicated at $3^a$) being pivoted in the frame 1 for steering purposes. In this form of construction, the frame 1 may be of triangular shape with the ends of the bar $2^a$ connected by a yoke 4. 5 indicates a pair of blocks disposed near the rear ends of the side frame sections. The blocks 5 are formed with openings $5^a$ which align with openings 6 formed in the side walls of the angle irons, so that an axle 7 may extend through said openings and be supported by the blocks 5 and project beyond the frame 1 to receive the hubs of the wheels 3. The wheels 3 may be held on the ends of the axle 7 by any well known means, such as a washer 8 and cotter pin 9.

The yoke member 4 preferably comprises a casting having an upwardly extending member $4^a$ and a pair of rearward extending arms $4^b$ rigidly secured in any desired manner to the free ends of the side frame sections. The member 4ᵃ extends upwardly and forwardly so as to form a support for the wheel 3ᵃ. The member 4ᵃ is preferably of curvilinear shape and disposed substantially concentrically to the point of intersection of the axes on which the wheel 3ᵃ rotates and steers, this construction serving as a shield or guard for the wheel 3ᵃ while permitting it to freely operate about its axis at all times.

At 10, the member 4ᵃ is formed with an opening and around the opening 10, the member 4ᵃ is provided with integral collars, 4ᶜ, 4ᵈ, which form a bearing 11 for the stem 12 of a forked member 12ᵃ. The forks 12ᵃ depend at either side of the wheel 3ᵃ and support at their free ends an axle 14 on which the wheel 3ᵃ is loosely mounted. The stem 12 has a reduced portion which provides an annular shoulder 12ᵇ adapted to engage the collar 4ᶜ. 15 indicates a set screw or other suitable device supported in the stem 12 above the collar 4ᵈ and co-acting with the shoulder 12ᵇ to hold the forked member 12ᵃ and yoke member 4 in assembled relationship.

16 indicates a slot formed in the upper end of the stem 12, disposed in a plane at right angles to the axle 14 and extending downwardly from the end of the stem 12. The lower portion of the stem 12 is preferably hollow as shown at 12ᶜ; in this form of construction the wall of the stem (1st) is thickened, as shown at 12ᵈ to form the side walls of the slot 16 and (2nd) is cut away to provide at opposite sides of the slot at or adjacent its lower end walls or stop devices 12ᵉ, to which reference will later be made. The end walls are preferably arranged at opposite sides of the axis of the stem 12 and equally distant therefrom and co-operate to form a seat for the lower end of a loop 19 (to which reference will later be made) when it is moved downwardly. 17 indicates a pin or rod extending across the slot 16 preferably intersecting the axis of the stem 12 and supported at its opposite ends in the thickened walls 12ᵈ of the stem 12. The rod 17 is preferably disposed near the upper end of the slot 16 for reasons which will later be apparent.

18 indicates the tong. When the tong is to be grasped by an operative, its outer end may be provided with a handle 18ᵃ. The inner end of the tong 18 is provided with an elongated loop 19, already referred to, it being preferably formed integrally with the tong. The rod 17 extends through the loop 19 and serves to pivotally connect the tong to the stem 12. The loop 19 is disposed in the slot 16 and through its engagement with the walls of the slot serves to rotate the stem 12 when the free end of the tong is moved laterally in either direction. As the loop 19 is elongated, the tong 18 may be moved bodily on and relative to the pin 17. When the tong 18 is not in use, such construction permits it to be moved to a vertical position and when in this position, it will be free to drop downwardly, that is, the loop 19 will slide on the pin 17 into engagement with the stop devices 12ᵉ at the lower end of the slot 16, and through its engagement therewith, the tong will be held against pivotal movement about the pin or rod 17. If the tong 18 is raised until the lower end of the loop 19 disengages the end walls or stop devices 12ᵉ, it may be swung about the pin or rod 17, as shown in dotted lines in Fig. 4.

To lock the tong in the upright position, it is swung upwardly to the vertical, bringing the loop 19 into alignment with the end walls 12ᵉ of the slot 16; it is then moved or permitted to gravitate downwardly. As a result of this movement, the loop 19 will seat itself against the end walls 12ᵉ which will co-act with the rod 17 to support the tong vertically and maintain it against pivotal and swingable movement thereabout. To release the tong for operation, the handle 18ᵃ is grasped and the tong elevated until the loop 19 engages the pin 17, whereupon the tong 18 may be swung forwardly to the desired operating position.

The slot 16 is preferably of a width to guide the loop 19 in its bodily movement upwardly and downwardly, as well as about the pin 17. In the event the stem 12 is solid throughout that portion below the slot 16, the latter need only be deep enough to form at opposite sides of the slot the end wall 12ᵉ.

When it is desired to prevent movement of the tong about the rod 17 rearwardly, the wall of the stem 12 at the rear side of the slot 16 is continued upwardly, that is, the rear end of the slot is closed, as shown at 12ˣ (Figs. 6 and 7), so as to form a stop or limiting means in the path of movement of the tong 18. As the wall 12ˣ extends above the axis of the rod 17, it will serve to limit the rearward movement of the tong, even when its loop 19 is in pivotal engagement with the rod 17.

From the foregoing description, it will be seen that the connection for the tong 18 is such that it may be locked or positioned vertically and released in a ready manner, the construction herein disclosed being such that no manipulation or operation of detachable elements are required and no operation of the tong, except the bodily lifting thereof, is necessary. The lifting movement is effected by the same hand which grasps the tong. In carrying out this operation, the operative is not required to bend or stoop over, so that minimum labor is required to either release or lock the tong.

It will be evident that many modifications of the invention can be made without interfering with the general structure and purpose of the same; hence I wish it to be understood that my disclosures and the description herein are purely illustrative and are not intended to be in any sense limiting, as widely differing embodiments and applications of the invention will suggest themselves to those skilled in the art without departing from the spirit and scope thereof.

What I claim is:

1. In a vehicle, the combination of a frame mounted on wheels, one of said wheels having a stem rotatably fitting an opening formed in the frame, whereby the wheel may be steered, said stem being formed with a slot extending inwardly from its free end and provided with spaced stop devices at the bottom of said slot and adjacent its opposite sides, a rod extending across said slot near its upper end, and a tong having at its inner end an elongated loop slidably fitting within the walls of the slot and pivotally and slidably mounted on said rod, said rod being disposed transversely of the vertical plane including said stop devices, whereby the positioning of the tong vertically and its movement downwardly into engagement with said stop devices will permit said devices and rod to lock the tong against pivotal movement.

2. In a vehicle, the combination of a frame mounted on wheels, one of said wheels having a stem rotatably mounted in said frame, whereby the vehicle may be steered, said stem being formed with a slot extending inwardly from its free end and provided with spaced stop devices at the bottom of said slot and adjacent its opposite sides, a rod extending across said slot near its upper end, a tong having at its inner end an elongated loop fitting between the walls of said slot and pivotally and slidably mounted on said rod, said rod being disposed transversely of the vertical plane including said stop devices, whereby the positioning of the tong vertically and its movement downwardly into engagement with said stop devices will permit said devices and rod to co-act to lock the tong against pivotal movement, and a wall bridging the rear end of said slot above the adjacent stop device for extended contact with one side of the loop of the tong to prevent rearward movement of said tong about said rod.

In testimony whereof, I have hereunto subscribed my name.

ANTHONY SCHROEDER.